United States Patent
Nam et al.

(10) Patent No.: US 11,546,916 B2
(45) Date of Patent: Jan. 3, 2023

(54) RATE-MATCHING OF PDSCH IN THE CONTROL RESOURCE SET

(71) Applicant: QUALCOMM Incorporated, San Diego, CA (US)

(72) Inventors: Wooseok Nam, San Diego, CA (US); Jing Sun, San Diego, CA (US); Xiaoxia Zhang, San Diego, CA (US); Tao Luo, San Diego, CA (US); Zhifei Fan, San Diego, CA (US); Sungwoo Park, San Diego, CA (US); Akula Reddy, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/081,878

(22) Filed: Oct. 27, 2020

(65) Prior Publication Data

US 2021/0127398 A1    Apr. 29, 2021

Related U.S. Application Data

(60) Provisional application No. 62/926,990, filed on Oct. 28, 2019.

(51) Int. Cl.
*H04W 72/04* (2009.01)
*H04L 1/00* (2006.01)
(Continued)

(52) U.S. Cl.
CPC ....... *H04W 72/0493* (2013.01); *H04L 1/0013* (2013.01); *H04L 27/2607* (2013.01);
(Continued)

(58) Field of Classification Search
CPC combination set(s) only.
See application file for complete search history.

(56) References Cited

U.S. PATENT DOCUMENTS

| 2019/0045490 A1* | 2/2019 | Davydov | ............ H04W 72/042 |
| 2019/0075553 A1* | 3/2019 | Sun | ........................ H04L 1/0067 |

(Continued)

FOREIGN PATENT DOCUMENTS

| WO | 2019160375 A1 | 8/2019 |
| WO | 2020014377 A1 | 1/2020 |

OTHER PUBLICATIONS

Huawei: et al., "Enhancements on Multi-TRP/Panel Transmission", 3GPP Draft, R1-1903970, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051699383, 20 Pages, Retrieved from the Internet: URL: http://www.3gpp.org/ftp/Meetings%5F3GPP%5FSYNC/RAN1/Docs/R1%2D1903970%2Ezip. [retrieved on Apr. 7, 2019] section "Rate Matching Mechanism Enhancement".

(Continued)

*Primary Examiner* — Andrew C Oh
(74) *Attorney, Agent, or Firm* — Patterson + Sheridan, L.L.P.

(57) ABSTRACT

Aspects of the present disclosure relate to wireless communications, and more particularly, to techniques for performing rate matching when resources for a physical downlink shared channel (PDSCH) overlap with resources of a control resource set (CORESET) in which a physical downlink control channel (PDCCH) that scheduled the PDSCH. As used herein, rate matching generally refers to the process of repeating or puncturing bits on a transport channel.

26 Claims, 8 Drawing Sheets

(51) Int. Cl.
    *H04L 27/26*     (2006.01)
    *H04W 72/12*     (2009.01)

(52) U.S. Cl.
    CPC ..... *H04W 72/042* (2013.01); *H04W 72/0446* (2013.01); *H04W 72/0453* (2013.01); *H04W 72/1289* (2013.01)

(56) References Cited

U.S. PATENT DOCUMENTS

| | | | |
|---|---|---|---|
| 2019/0158205 A1* | 5/2019 | Sheng | H04B 7/0626 |
| 2019/0222400 A1* | 7/2019 | Bagheri | H04L 5/0082 |
| 2019/0261252 A1* | 8/2019 | John Wilson | H04W 72/005 |
| 2019/0261327 A1* | 8/2019 | Hosseini | H04L 5/0053 |
| 2019/0319692 A1* | 10/2019 | Noh | H04L 5/0048 |
| 2020/0022168 A1* | 1/2020 | Xu | H04L 5/0051 |
| 2020/0029310 A1* | 1/2020 | Lee | H04W 72/042 |

OTHER PUBLICATIONS

International Search Report and Written Opinion—PCT/US2020/057723—ISA/EPO—dated Feb. 8, 2021.
NTT Docomo, Inc: "Resource Sharing Between Data and Control Channels", 3GPP Draft; R1-1711093, 3GPP TSG RAN WG1 NR Ad-Hoc#2, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051300293, pp. 1-7, Retrieved from the Internet: URL:http://www.3gpp.org/ftp/Meetings_3GPP_SYNC/RAN1/Docs/ [retrieved on Jun. 26, 2017] Sections 2.1 and 2.2, Figures 2, 3.

* cited by examiner (a) Micro-sleep with cross-slot scheduling
(b) Microsleep w/o cross-slot scheduling

RATE-MATCHING OF PDSCH IN THE CONTROL RESOURCE SET

PRIORITY CLAIM(S)

This application claims benefit of the priority to U.S. Provisional Application No. 62/926,990, filed on Oct. 28, 2019, which is expressly incorporated by reference in its entirety as if fully set forth below and for all applicable purposes.

TECHNICAL FIELD

Aspects of the present disclosure relate to wireless communications, and more particularly, to techniques for performing rate matching when resources for a physical downlink shared channel (PDSCH) overlap with resources of a control resource set (CORESET) in which a physical downlink control channel (PDCCH) that scheduled the PDSCH.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

Certain aspects of the present disclosure are directed to a method for wireless communication by a user equipment (UE). The method generally includes detecting multiple physical downlink control channels (PDCCHs) in a slot of a control resource set (CORESET), identifying one or more of the PDCCHs detected on resources of the CORESET that overlap with resources of at least one physical downlink shared channel (PDSCH) scheduled by at least one of the PDCCHs in the same slot, determining which of the identified PDCCHs to perform PDSCH rate matching around, and processing the PDSCH in accordance with the determination.

Certain aspects of the present disclosure are directed to an apparatus for wireless communication by a UE. The apparatus generally includes a memory and at least one processor coupled to the memory, the memory and the at least one processor being configured to detect multiple PDCCHs in a slot of a CORESET, identify one or more of the PDCCHs detected on resources of the CORESET that overlap with resources of at least one PDSCH scheduled by at least one of the PDCCHs in the same slot, determine which of the identified PDCCHs to perform PDSCH rate matching around, and process the PDSCH in accordance with the determination.

Certain aspects of the present disclosure are directed to an apparatus for wireless communication by a UE. The apparatus generally includes means for detecting multiple PDCCHs in a slot of a CORESET, means for identifying one or more of the PDCCHs detected on resources of the CORESET that overlap with resources of at least one PDSCH scheduled by at least one of the PDCCHs in the same slot, means for determining which of the identified PDCCHs to perform PDSCH rate matching around, and means for processing the PDSCH in accordance with the determination.

Certain aspects of the present disclosure are directed to a computer readable medium having instructions stored thereon for detecting multiple PDCCHs in a slot of a CORESET, identifying one or more of the PDCCHs detected on resources of the CORESET that overlap with resources of at least one PDSCH scheduled by at least one of the PDCCHs in the same slot, determining which of the identified PDCCHs to perform PDSCH rate matching around, and processing the PDSCH in accordance with the determination.

Certain aspects of the present disclosure are directed to a method for wireless communication by a network entity. The method generally includes transmitting multiple PDCCHs to a UE in a slot of a CORESET, identifying one or more of the PDCCHs that overlap with resources of at least one PDSCH scheduled by at least one of the PDCCHs in the same slot, determining which of the identified PDCCHs to perform PDSCH rate matching around, and transmitting the PDSCH with PDSCH rate matching in accordance with the determination.

Certain aspects of the present disclosure are directed to an apparatus for wireless communication by a network entity. The apparatus generally includes a memory and at least one processor coupled to the memory, the memory and the at least one processor being configured to transmit multiple PDCCHs to a UE in a slot of a CORESET, identify one or more of the PDCCHs that overlap with resources of at least one PDSCH scheduled by at least one of the PDCCHs in the same slot, determine which of the identified PDCCHs to perform PDSCH rate matching around, and transmit the PDSCH with PDSCH rate matching in accordance with the determination.

Certain aspects of the present disclosure are directed to an apparatus for wireless communication by a network entity. The apparatus generally includes means for transmitting multiple PDCCHs to a UE in a slot of a CORESET, means for identifying one or more of the PDCCHs that overlap with resources of at least one PDSCH scheduled by at least one of the PDCCHs in the same slot, means for determining which of the identified PDCCHs to perform PDSCH rate matching around, and means for transmitting the PDSCH with PDSCH rate matching in accordance with the determination.

Certain aspects of the present disclosure are directed to a computer readable medium having instructions stored thereon for transmitting multiple PDCCHs to a UE in a slot of a CORESET, identifying one or more of the PDCCHs that overlap with resources of at least one PDSCH scheduled by at least one of the PDCCHs in the same slot, determining which of the identified PDCCHs to perform PDSCH rate matching around, and transmitting the PDSCH with PDSCH rate matching in accordance with the determination.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to techniques for performing rate matching when resources for a physical downlink shared channel (PDSCH) overlap with resources of a control resource set (CORESET) in which a physical downlink control channel (PDCCH) that scheduled the PDSCH.

The following description provides examples of dynamic control channel resource signaling and processing techniques, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
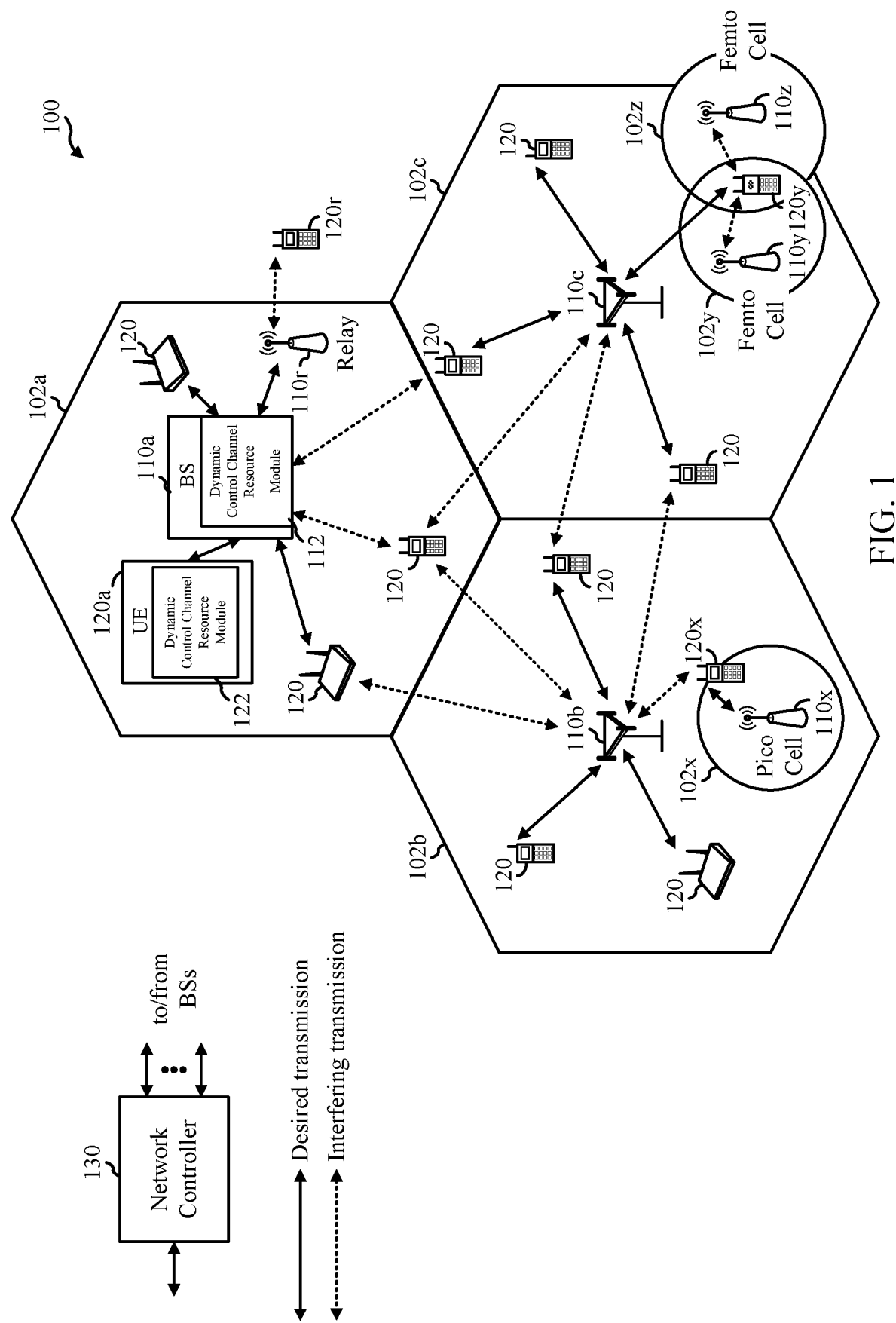
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, a UE 120a may include a PDSCH Rate Matching Module 122 that may be configured to perform (or cause UE 120a to perform) operations 600 of FIG. 6. Similarly, base station 110a may include a PDSCH Rate Matching Module 112 that may be configured to perform (or cause BS 110a to perform) operations 700 of FIG. 7 (e.g., to transmit a PDSCH with rate matching to a UE performing operations 600).

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110*a*-*z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a*-*y* (each also individually referred to herein as UE 120 or collectively as UEs 120) in the wireless communication network 100. The UEs 120 (for example, 120*x*, 120*y*, etc.) may be dispersed throughout the wireless communication network 100, and each UE 120 may be stationary or mobile.

Wireless communication network 100 may also include relay stations (for example, relay station 110*r*), also referred to as relays or the like, that receive a transmission of data or other information from an upstream station (for example, a BS 110*a* or a UE 120*r*) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
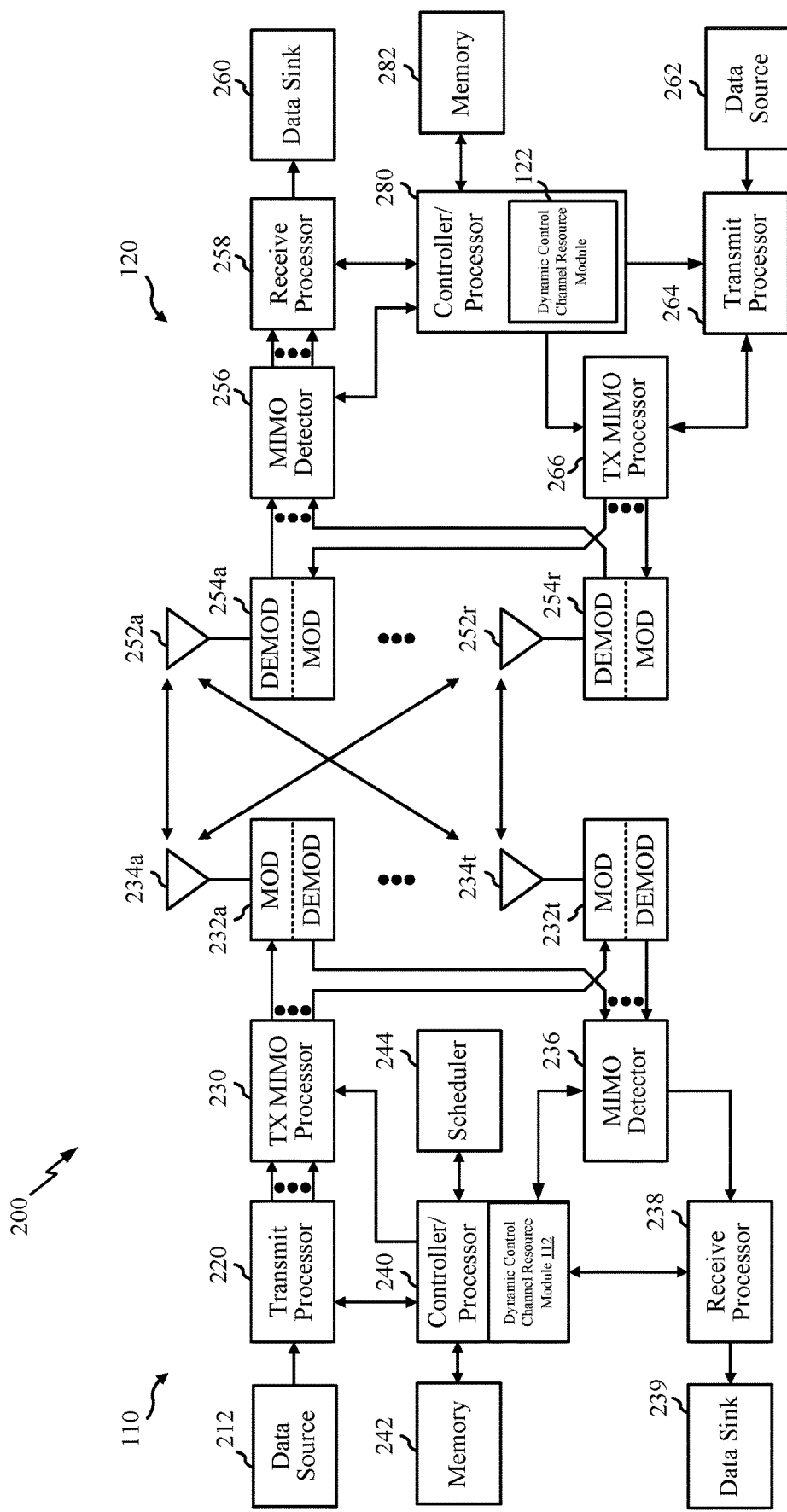
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232*a*-232*t*. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232*a*-232*t* may be transmitted via the antennas 234*a*-234*t*, respectively.

At the UE 120, the antennas 252*a*-252*r* may receive the downlink signals from the BS 110 and may provide received signals to the demodulators (DEMODs) in transceivers 254*a*-254*r*, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254*a*-254*r* (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a PDSCH Rate Matching Module 122 that may be configured to perform operations 600 of FIG. 6, while the controller/processor 240 of the BS 110 has a PDSCH Rate Matching Module 112 that may be configured to perform operations 700 of FIG. 7. Although shown at the Controller/Processor, other components of the UE or BS may be used to perform the operations described herein.

Figure 3:
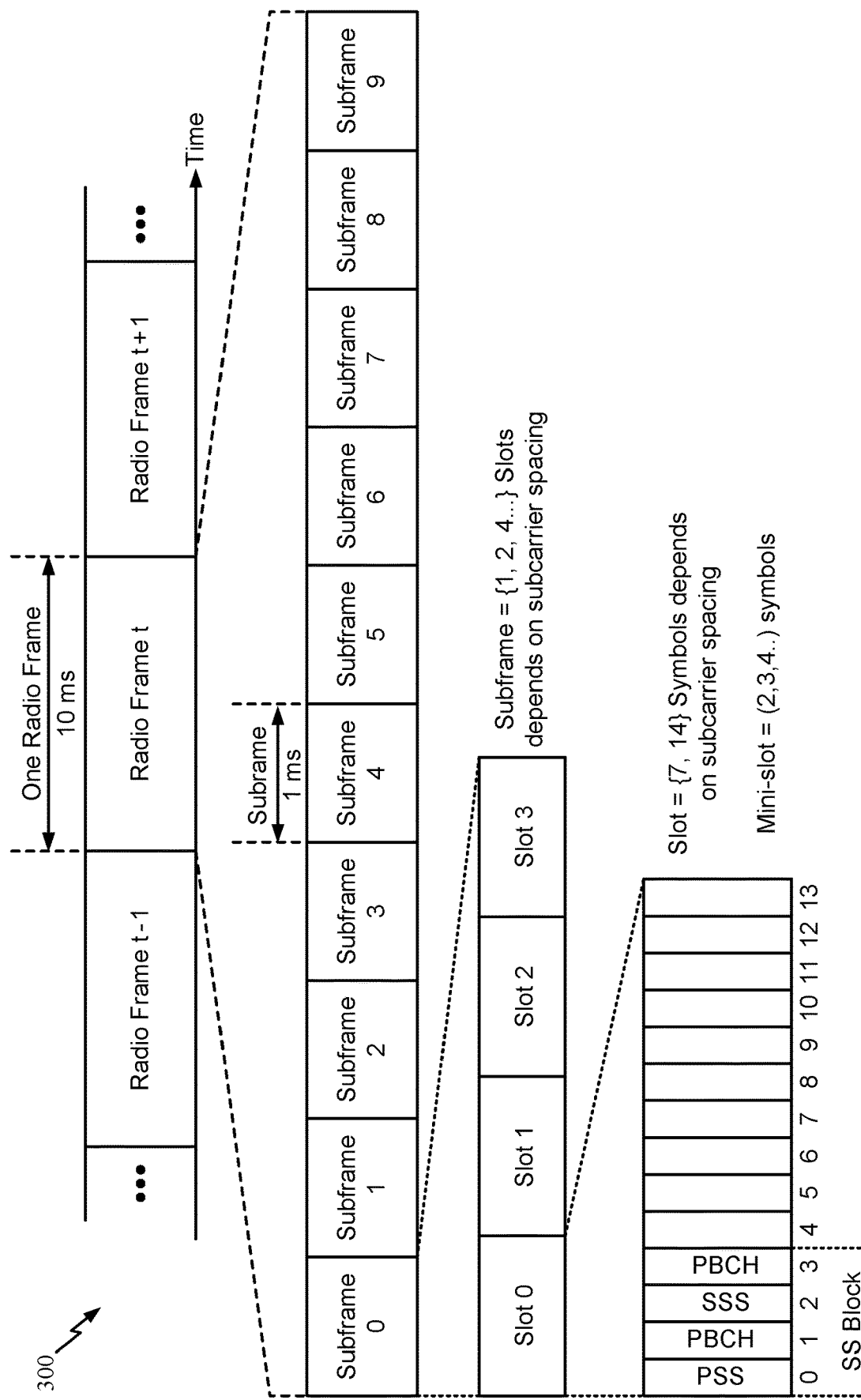
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A CORESET for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example PDSCH Rate Matching in a CORESET

Aspects of the present disclosure relate to wireless communications, and more particularly, to techniques for performing rate matching when resources for a physical downlink shared channel (PDSCH) overlap with resources of a control resource set (CORESET) in which a physical downlink control channel (PDCCH) that scheduled the PDSCH. As used herein, rate matching generally refers to the process of repeating or puncturing bits on a transport channel.

As described in greater detail below, rate matching may be performed to avoid a collision, for example, when resources allocated to one type of transmission (e.g., PDSCH) overlap with resources of another type of transmission (e.g., PDCCH). In some cases, PDSCH rate matching may be performed upon identifying one or more PDCCHs on resources of the CORESET that overlap with resources of at least one PDSCH scheduled by at least one of the PDCCHs in the same slot.

The techniques presented herein may be applied in various bands utilized for new radio (NR). For example, for the higher band referred to as frequency range 4 (FR4) (e.g., 52.6 GHz to 114.25 GHz), an orthogonal frequency division multiplexed (OFDM) waveform with very large subcarrier spacing (e.g., 960 kHz to 3.84 MHz) is required to combat severe phase noise. Due to the relatively large subcarrier spacing, the slot length tends to be very short. In a lower band referred to as FR2 (e.g., 24.25 GHz to 52.6 GHz) with 120 kHz subcarrier spacing (SCS), the slot length is 125 μs, while in FR4 with 960 kHz SCS, the slot length is 15.6 μs.

Figure 4A:
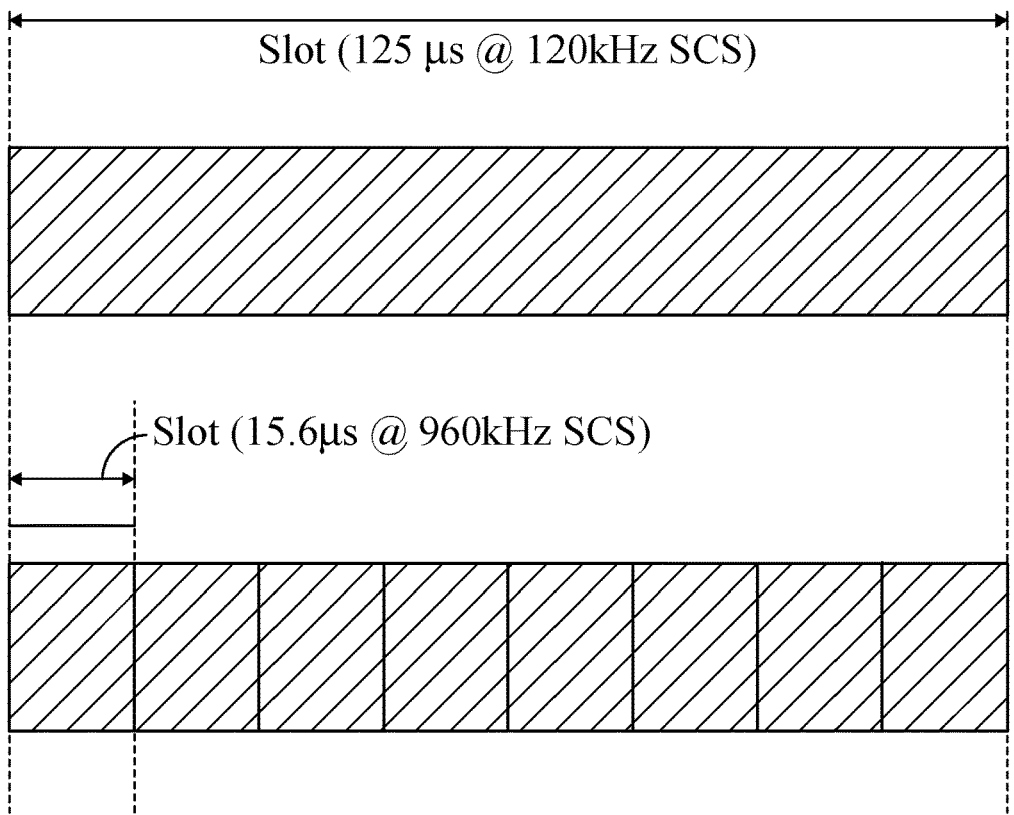
FIGS. 4A and 4B illustrate example transmission time interval (TTI) structures, in accordance with some aspects of the present disclosure.

FIG. 4A shows a comparison of slot length for FR2 and FR4. The shorter slot length of FR4 (in comparison to that of FR2) creates challenges. For example, due to implementation complexity, a device's processing timeline (e.g., for control and/or data processing) may not proportionally scale with the slot length.

As a result, even with same-slot scheduling, FR2 may enjoy the power saving benefit of micro-sleep. However, in FR4, control channel processing may overrun the slot length, and micro-sleep may not be eligible. This is illustrated in FIG. 4B, which shows that processing times may far exceed FR4 slot lengths.

In FR2, a UE may be configured to monitor PDCCH in every slot. However, in FR4, due to limited processing capability and shorter slot length, the minimum PDCCH monitoring periodicity may need to be greater than one slot.

In certain applications, a UE may be designed to support a limited number of NR features (also referred to as NR Light or NR Lite), for example, to keep costs relatively low. However, due to limited device capability in such applications, a UE may not be able to monitor PDCCH in every slot.

Figure 4B:
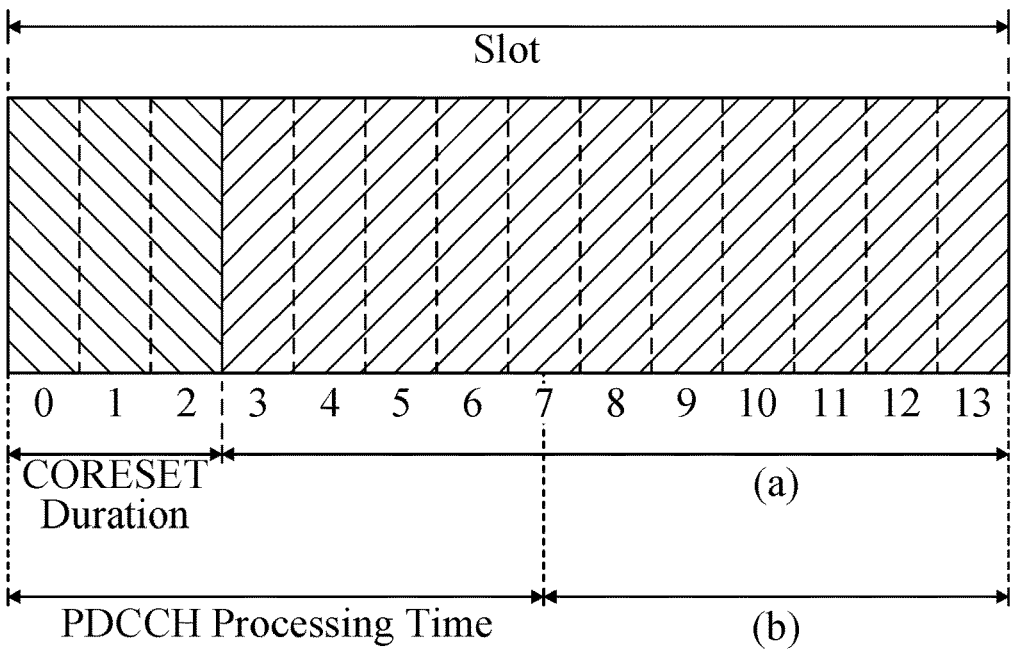

In FR4 or NR Lite applications, control channel resources (e.g., CORESETs as shown in FIG. 4B and search space sets) can be sparsely configured (e.g., occurring with a relatively low periodicity). Sparse control channel monitoring by the UE may alleviate the issues described above and provides a power saving gain. For example, a PDCCH monitoring periodicity (e.g., by search space periodicity configuration in NR) can be very large (e.g., much greater than 1 slot) in FR4.

Figure 5A:
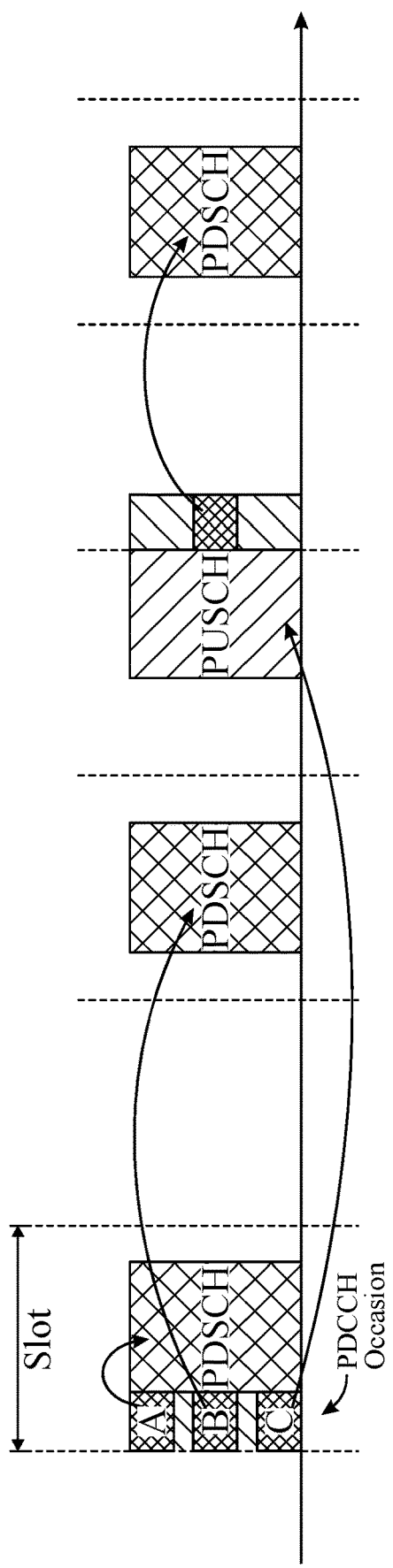
FIGS. 5A and 5B illustrate examples of control channel resource sets, same-slot and cross-slot grants, in accordance with some aspects of the present disclosure.

As illustrated in FIG. 5A, in order to not limit scheduling flexibility with the spare control channel resources, multiple downlink (DL) and/or uplink (UL) scheduling grants (e.g., either same-slot or cross-slot grant) for a same UE can be delivered in the same control channel (e.g., PDCCH) occasion. While the PDCCH occasions may occur relatively infrequently, the use of multiple grants may at least allow multiple transmissions to be scheduled between the sparse PDCCH occasions. This may help accommodate periods of bursty traffic to or from the UE.

Figure 5B:
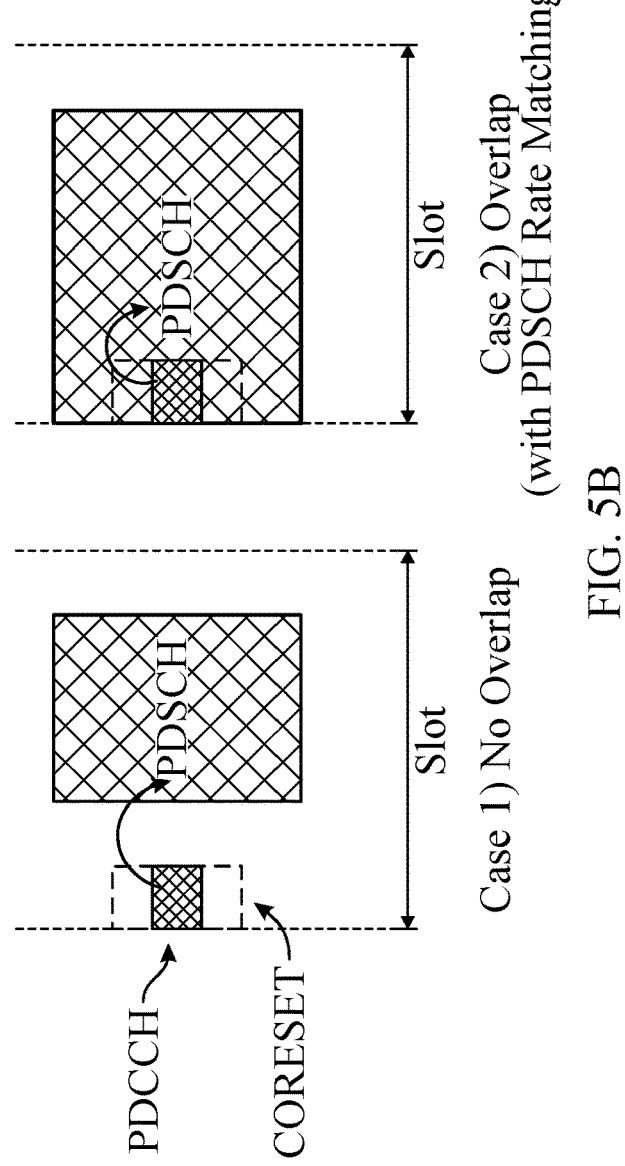

As illustrated in FIG. 5B, same-slot grants allow data to be delivered to the same UE (e.g., in a PDSCH) within the same control channel occasion that scheduled the data. As illustrated, in some cases, the PDSCH scheduled by a PDCCH might overlap with the resources in the CORESET containing the PDCCH. In such cases, PDSCH rate matching may be performed, for example, where the resources corresponding to a union of the detected PDCCH that scheduled the PDSCH and associated demodulation reference signal (DM-RS) are not available for PDSCH.

Current standards (e.g., Rel-15) allow PDSCH rate matching around only the detected PDCCH that scheduled the PDSCH within the CORESET. If there are other PDCCHs (e.g., cross-slot scheduling grants) in the same CORESET, the PDSCH does not rate match around them.

However, allowing PDSCH rate matching around only the PDCCH that scheduled the PDSCH may limit the application of multiple grant transmissions in the same CORESET (e.g., if a scheduling gNB avoids using these resources for other grants), and/or impair the PDSCH decoding performance (e.g., if the scheduling gNB does use these resources for other grants).

Accordingly, aspects of the present disclosure provides techniques for PDSCH rate matching around not only the PDCCH that scheduled the PDSCH, but also other PDCCHs within the CORESET. As such, scheduling flexibility may be increased without a negative impact on PDSCH decoding.

Figure 6:
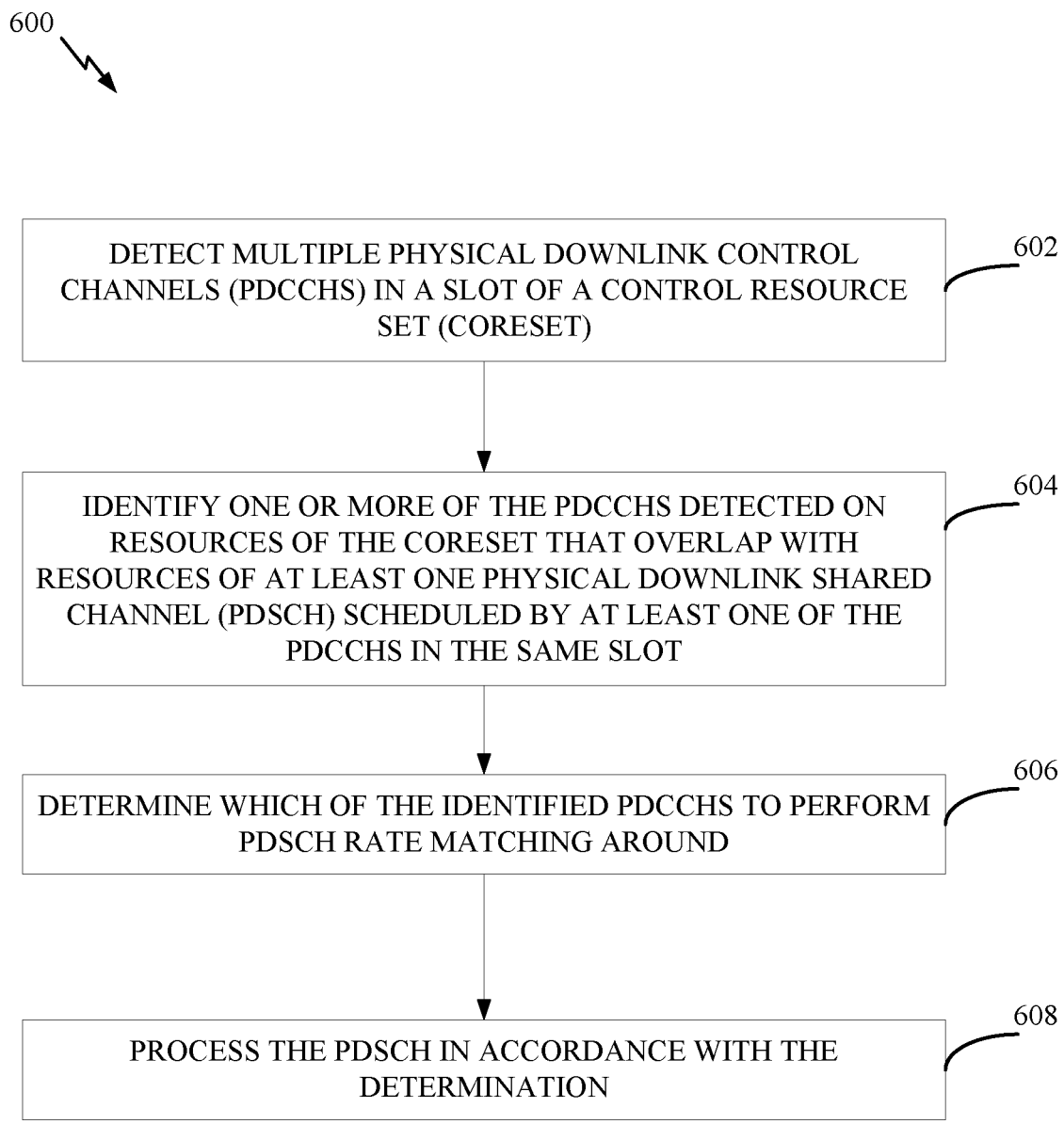
FIG. 6 illustrates example operations for wireless communication by a UE, in accordance with some aspects of the present disclosure.

FIG. 6 illustrates example operations 600 for wireless communication by a UE, in accordance with some aspects of the present disclosure. For example, operations 600 may be performed by a UE 120a of FIG. 1 to perform PDSCH rate matching.

Operations 600 begin, at 602, by detecting multiple PDCCHs in a slot of a CORESET. At 604, the UE identifies one or more of the PDCCHs detected on resources of the CORESET that overlap with resources of at least one PDSCH scheduled by at least one of the PDCCHs in the same slot. At 606, the UE determines which of the identified PDCCHs to perform PDSCH rate matching around. At 608, the UE processes the PDSCH in accordance with the determination.

Figure 7:
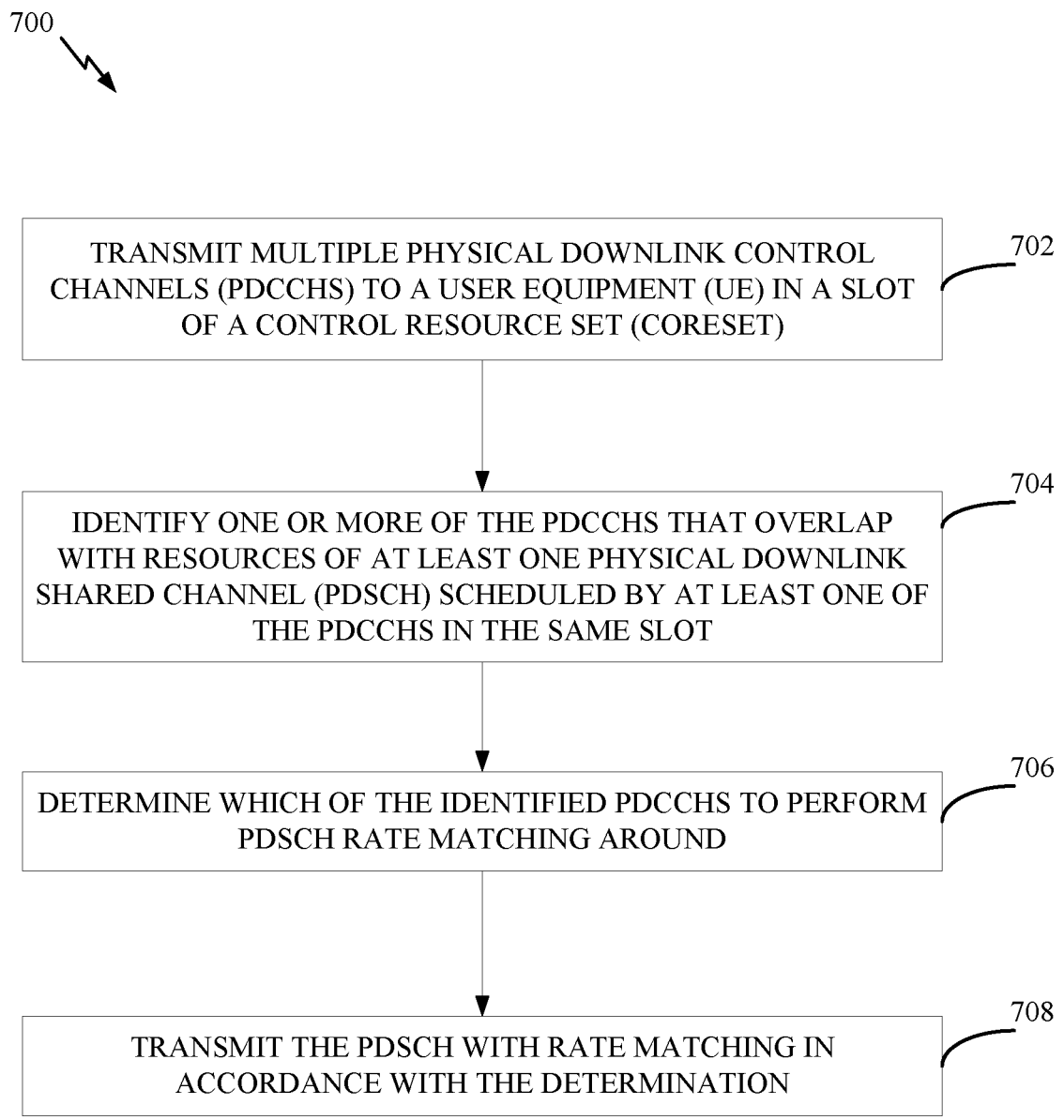
FIG. 7 illustrates example operations for wireless communication by a network entity, in accordance with some aspects of the present disclosure.

FIG. 7 illustrates example operations 700 for wireless communication by a network entity (e.g., a gNB). For example, operations 700 may be performed by a base station 110a of FIG. 1 to transmit a PDSCH with rate matching to a UE 120 (performing operations 600).

Operations 700 begin, at 702, by transmitting multiple PDCCHs to a UE in a slot of a CORESET. At 704, the network entity identifies one or more of the PDCCHs that overlap with resources of at least one PDSCH scheduled by at least one of the PDCCHs in the same slot. At 706, the network entity determines which of the identified PDCCHs to perform PDSCH rate matching around. At 708, the network entity transmits the PDSCH with rate matching in accordance with the determination.

In some examples, PDSCH rate matching around multiple PDCCHs in a CORESET would be to allow PDSCH rate matching around all detected PDCCH within the CORESET, not just its own scheduling PDCCH. This solution may be less than ideal, because if a UE fails in detecting a PDCCH (e.g., misdetection), which is not its own scheduling PDCCH, the UE may assume that there is no PDCCH on the resource and the UE will not perform any rate matching. However, from the BS side, the resource is already taken by a PDCCH transmission and the BS will perform PDSCH rate matching for the resource. Due to this misalignment and/or ambiguity between the UE and the BS, the PDSCH may not be correctly decoded at the UE.

A potentially more advanced solution involves selecting which of the multiple (potential) PDCCHs are to be rate matched around. In some cases, potential PDCCH candidates may be ordered and selected based on the ordering. PDCCH transmissions are sent within defined search space sets, where each search space generally refers to a set of time and frequency resources a UE can monitor for PDCCH transmission.

Figure 8:
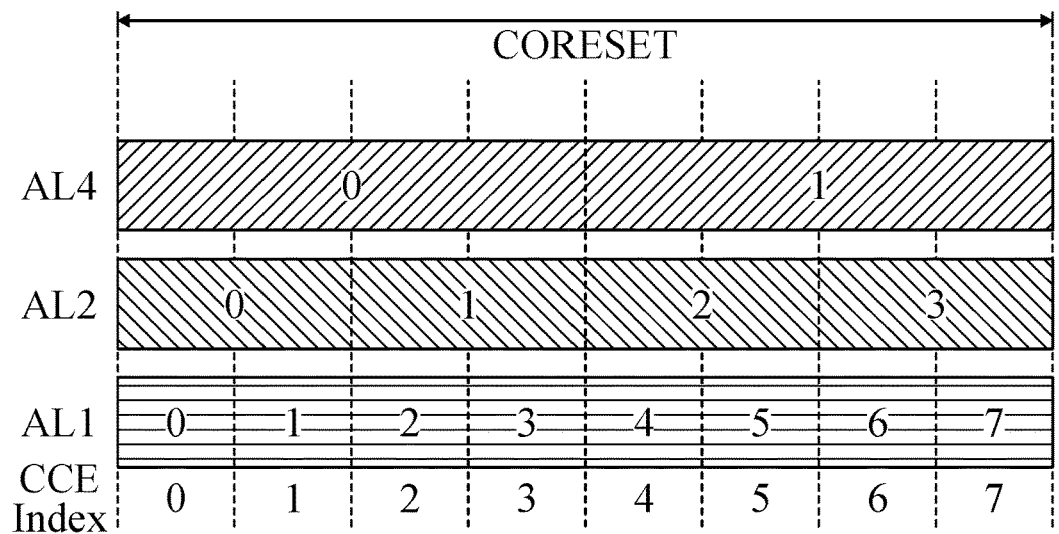
FIG. 8 illustrates example search space (SS) structures within a control resource set (CORESET), in accordance with some aspects of the present disclosure.

As illustrated in FIG. 8, depending on an aggregation level, each search space (SS) may be mapped to one or more control channel element (CCEs) within the CORESET associated with the search space set. For example, for aggregation level (AL) 1, each SS is mapped to 1 CCE, for AL 2, each SS is mapped to 2 CCEs, while for AL 4, each SS is mapped to 4 CCEs.

In certain aspects, ordering PDCCHs may be accomplished by assigning each SS within the search space set a unique index. In the example shown in FIG. 8, each SS in AL 1 is assigned an index from 0 to 7, each SS in AL 2 is assigned an index from 0-3, and each SS in AL 4 is assigned an index from 0-1.

Figure 9:
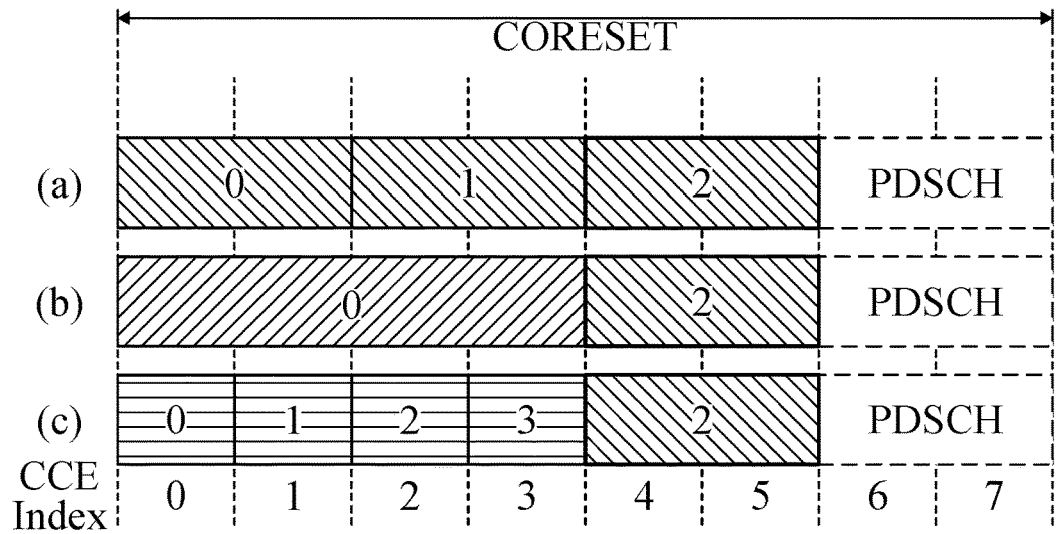
FIG. 9 illustrates an example of physical downlink shared channel (PDSCH) rate matching within the CORESET of FIG. 8, in accordance with some aspects of the present disclosure.

From the assigned index, a UE and BS can identify the position and size (e.g., CCE assignment) of the corresponding SS within the CORESET. The particular index assigned to an SS may be a function of one or more parameters, such as one or more of aggregation level, CCE position (time/frequency domain(s)) within the CORESET, slot index, or carrier index. As illustrated in FIG. 9, the set of indexes assigned to each SS may be accounted per AL (e.g., restarting with index 0 each AL).

In some cases, the SS indices may be used for targeted PDSCH rate matching around one or more PDCCHs in a CORESET. If a PDCCH transmitted in an SS with index n (e.g., SS n) schedules a PDSCH in the same slot (e.g., a same-slot grant) and that PDSCH overlaps with resources in the CORESET containing the scheduling PDCCH, the PDSCH may be rate matched in the CORESET around all CCEs associated with SSs of the same AL, whose indexes are lower than or equal to n.

Referring to an example shown in FIG. 9, assuming a search space with index of 2 (e.g., SS 2) of AL 2 contains a PDCCH for a same-slot grant, the UE and BS both assume that PDSCH(s) are rate matched around CCEs corresponding to SS 0 and SS 1 (as well as SS 2). Thus, in this example, CCEs 0-5 are not available for PDSCH, but CCEs 6 and 7 are available. For SS 0 and SS 1 of AL 2, PDCCH can be transmitted in the other SS 0 and SS 1. For CCEs 0-3, another PDCCH with AL 4 can be transmitted or up to 4 PDCCHs with AL 1 can be transmitted (with other combination also possible, such as 2 PDCCHs with AL 1 and one with AL 2).

By allowing rate matching around other PDCCHs in the same CORESET (other than the PDCCH scheduling the PDSCH with overlapping resources), other PDCCHs (e.g., cross-slot grants for the same or different UEs) can be transmitted within the rate-matched CCEs, making more efficient use of resources to provide scheduling flexibility. Another advantage of this approach is that, even if some of these other PDCCHs are missed, there is no ambiguity in the rate matching pattern. Thus, misdetection would not impact the rate matching pattern.

In some cases, the rate matching approach provided herein may be applied to perform rate matching for time-domain control resources. For example, for time-domain control resources (e.g., a single-carrier waveform), a CCE may be mapped to a set of consecutive time-domain samples.

Figure 10:
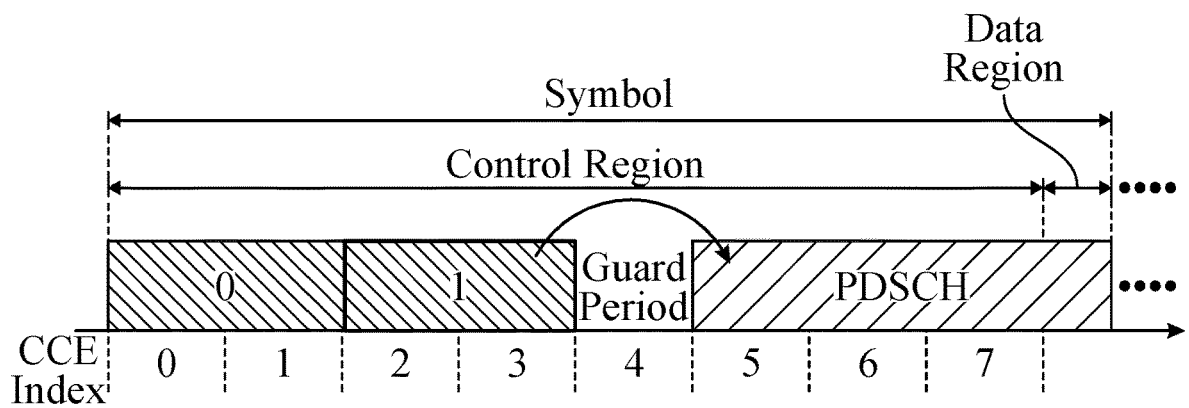
FIG. 10 illustrates an example of PDSCH rate matching for time-domain control resources, in accordance with some aspects of the present disclosure.

As illustrated in FIG. 10, in some cases, a time-domain guard period can be inserted between a PDCCH and a rate-matched PDSCH (e.g., to accommodate beam-switching and/or radio frequency (RF) retuning delay). In some cases, the presence and/or length of the guard period can be semi-statically configured. In some examples, the characteristics of the guard period may be a function of UE capability reported to the gNB.

The example shown in FIG. 10 has a control region with 8 time-domain CCEs. As illustrated, two PDCCHs of AL 2 are transmitted over SS 0 and SS 1. Assuming SS 1 contains a same-slot grant, CCE 4 (or portion of CCE 4) may be used as a guard period and thus may not be available for PDSCH (which could be considered a form of rate matching although not around another channel in particular), while CCEs 5 through 7 would be used for PDSCH (e.g., rate matching).

Example Aspects

Aspect 1: A method for wireless communications by a user equipment (UE), comprising detecting multiple physical downlink control channels (PDCCHs) in a slot of a control resource set (CORESET), identifying one or more of the PDCCHs detected on resources of the CORESET that overlap with resources of at least one physical downlink shared channel (PDSCH) scheduled by at least one of the PDCCHs in the same slot, determining which of the identified PDCCHs to perform PDSCH rate matching around, and processing the PDSCH in accordance with the determination.

Aspect 2: The method of any of Aspect 1, wherein the determination is based on an ordering of each detected PDCCH within the CORESET.

Aspect 3: The method of Aspect 2, wherein the ordering of each detected PDCCH is based on an index for a search space (SS) in which that PDCCH is detected.

Aspect 4: The method of Aspect 3, wherein if the PDSCH is scheduled by a PDCCH detected in a SS having an index n, processing the PDSCH comprises rate matching the PDSCH in the CORESET around CCEs associated with SSs of a same aggregation level (AL), whose indexes are less than or equal to n.

Aspect 5: The method of Aspect 4, wherein the index for each SS is determined based on a function of at least one of: AL, a CCE position within the CORESET, a slot or time index, a UE index, a base station index, a carrier index, or a frequency index.

Aspect 6: The method of Aspect 4 or 5, wherein a range of values for an SS index for an SS set depends on an AL for that SS set.

Aspect 7: The method of any of Aspects 4-6, wherein the rate matching is based at least in part on guard period between the PDSCH and one of the identified PDCCHs.

Aspect 8: The method of Aspect 7, wherein the guard period is semi-statically configured.

Aspect 9: The method of Aspect 7 or 8, wherein the guard period is based at least in part on a capability of the UE reported to a network entity.

Aspect 10: A method for wireless communications by a network entity, comprising transmitting multiple PDCCHs to a UE in a slot of a CORESET, identifying one or more of the PDCCHs that overlap with resources of at least one PDSCH scheduled by at least one of the PDCCHs in the same slot, determining which of the identified PDCCHs to perform PDSCH rate matching around, and transmitting the PDSCH in accordance with the determination.

Aspect 11: The method of Aspect 10, wherein the determination is based on an ordering of each detected PDCCH within the CORESET.

Aspect 12: The method of Aspect 11, wherein the ordering of each detected PDCCH is based on an index for a SS in which that PDCCH is detected.

Aspect 13: The method of Aspect 12, wherein if the PDSCH is scheduled by a PDCCH detected in a SS having an index n, processing the PDSCH comprises rate matching the PDSCH in the CORESET around CCEs associated with SSs of a same AL, whose indexes are less than or equal to n.

Aspect 14: The method of Aspect 13, wherein the index for each SS is be determined based on a function of at least one of: AL, a CCE position within the CORESET, a slot or time index, a UE index, a base station index, a carrier index, or a frequency index.

Aspect 15: The method of Aspect 13 or 14, wherein a range of values for an SS index for an SS set depends on an AL for that SS set.

Aspect 16: The method of any of Aspects 13-15, wherein the rate matching is based at least in art on a guard period between the PDSCH and one of the identified PDCCHs.

Aspect 17: The method of Aspect 16, wherein the guard period is semi-statically configured.

Aspect 18: The method of Aspect 16 or 17, wherein the guard period is based at least in part on a capability of the UE reported to the network entity.

Aspect 19: An apparatus for wireless communications by a UE, comprising at least one processor and a memory configured to detect multiple PDCCHs in a slot of a CORESET, identify one or more of the PDCCHs detected on resources of the CORESET that overlap with resources of at least one physical downlink shared channel (PDSCH) scheduled by at least one of the PDCCHs in the same slot, determine which of the identified PDCCHs to perform PDSCH rate matching around, and process the PDSCH in accordance with the determination.

Aspect 20: The apparatus of Aspect 19, wherein the determination is based on an ordering of each detected PDCCH within the CORESET.

Aspect 21: The apparatus of Aspect 20, wherein the ordering of each detected PDCCH is based on an index for a SS in which that PDCCH is detected.

Aspect 22: The apparatus of Aspect 21, wherein if the PDSCH is scheduled by a PDCCH detected in a SS having an index n, processing the PDSCH comprises rate matching the PDSCH in the CORESET around CCEs associated with SSs of a same AL, whose indexes are less than or equal to n.

Aspect 23: The apparatus of Aspect 22, wherein the index for each SS is determined based on a function of at least one of: AL, a CCE position within the CORESET, a slot or time index, a UE index, a base station index, a carrier index, or a frequency index.

Aspect 24: The apparatus of Aspect 22 or 23, wherein a range of values for an SS index for an SS set depends on an AL for that SS set.

Aspect 25: The apparatus of any of Aspects 22-24, wherein the rate matching is based at least in part on guard period between the PDSCH and one of the identified PDCCHs.

Aspect 26: The apparatus of Aspect 25, wherein the guard period is semi-statically configured.

Aspect 27: The apparatus of Aspect 25 or 26, wherein the guard period is based at least in part on a capability of the UE reported to a network entity.

Aspect 28: An apparatus for wireless communications by a network entity, comprising at least one processor and a memory configured to transmit multiple PDCCHs to a UE in a slot of a CORESET, identify one or more of the PDCCHs that overlap with resources of at least one PDSCH scheduled by at least one of the PDCCHs in the same slot, determine which of the identified PDCCHs to perform PDSCH rate matching around, and transmit the PDSCH in accordance with the determination.

Aspect 29: The apparatus of Aspect 28, wherein the determination is based on an ordering of each detected PDCCH within the CORESET.

Aspect 30: The apparatus of Aspect 29, wherein the ordering of each detected PDCCH is based on an index for a SS in which that PDCCH is detected.

Aspect 31: A computer readable having instructions stored thereon to execute any of the methods of aspects 1-18.

Aspect 32: An apparatus for wireless communication configured with means to perform any of the methods of aspects 1-18.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz).

Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors 266, 258, 264, and/or controller/processor 280 of the UE 120 shown in FIG. 2 may be configured to perform operations 600 of FIG. 6, and/or processors 220, 230, 238, and/or controller/processor 240 of the BS 110 shown in FIG. 2 may be configured to perform operations 700 of FIG. 7.

Means for receiving may include a receiver (such as one or more antennas or receive processors) illustrated in FIG. 2. Means for transmitting or means for outputting may include a transmitter or an antenna(s) 234 of the BS 110 and/or antenna(s) 252 of the UE 120 illustrated in FIG. 2. Each of means for identifying, means for detecting, means for monitoring, means for skipping to monitor, means for determining, means for applying, means for rate matching, and means for providing may include a processing system, which may include one or more processors, such as processors 266, 258, 264, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware, and software has been described generally, in terms of functionality, and illustrated in the various illustrative components, blocks, modules, circuits, and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
    detecting multiple physical downlink control channels (PDCCHs) in a slot of a control resource set (CORESET);
    identifying one or more of the PDCCHs detected on resources of the CORESET that overlap with resources of at least one physical downlink shared channel (PDSCH) scheduled by at least one of the PDCCHs in the same slot;
    determining which of the identified PDCCHs to perform PDSCH rate matching around, wherein the determination is based on an ordering of each detected PDCCH within the CORESET; and
    processing the PDSCH in accordance with the determination.

2. The method of claim 1, wherein the ordering of each detected PDCCH is based on an index for a search space (SS) in which that PDCCH is detected.

3. The method of claim 2, wherein:
    if the PDSCH is scheduled by a PDCCH detected in a SS having an index n, processing the PDSCH comprises rate matching the PDSCH in the CORESET around CCEs associated with SSs of a same aggregation level (AL), whose indexes are less than or equal to n.

4. The method of claim 3, wherein the index for each SS is determined based on a function of at least one of: AL, a CCE position within the CORESET, a slot or time index, a UE index, a base station index, a carrier index, or a frequency index.

5. The method of claim 3, wherein a range of values for an SS index for an SS set depends on an AL for that SS set.

6. The method of claim 3, wherein the rate matching is based at least in part on guard period between the PDSCH and one of the identified PDCCHs.

7. The method of claim 6, wherein the guard period is semi-statically configured.

8. The method of claim 6, wherein the guard period is based at least in part on a capability of the UE reported to a network entity.

9. A method for wireless communications by a network entity, comprising:
    transmitting multiple physical downlink control channels (PDCCHs) to a user equipment (UE) in a slot of a control resource set (CORESET);
    identifying one or more of the PDCCHs that overlap with resources of at least one physical downlink shared channel (PDSCH) scheduled by at least one of the PDCCHs in the same slot;
    determining which of the identified PDCCHs to perform PDSCH rate matching around, wherein the determination is based on an ordering of each detected PDCCH within the CORESET; and
    transmitting the PDSCH in accordance with the determination.

10. The method of claim 9, wherein the ordering of each detected PDCCH is based on an index for a search space (SS) in which that PDCCH is detected.

11. The method of claim 10, wherein:
    if the PDSCH is scheduled by a PDCCH detected in a SS having an index n, processing the PDSCH comprises rate matching the PDSCH in the CORESET around CCEs associated with SSs of a same aggregation level (AL), whose indexes are less than or equal to n.

12. The method of claim 11, wherein the index for each SS is be determined based on a function of at least one of: AL, a CCE position within the CORESET, a slot or time index, a UE index, a base station index, a carrier index, or a frequency index.

13. The method of claim 11, wherein a range of values for an SS index for an SS set depends on an AL for that SS set.

14. The method of claim 11, wherein the rate matching is based at least in art on a guard period between the PDSCH and one of the identified PDCCHs.

15. The method of claim 14, wherein the guard period is semi-statically configured.

16. The method of claim 14, wherein the guard period is based at least in part on a capability of the UE reported to the network entity.

17. An apparatus for wireless communications by a user equipment (UE), comprising at least one processor and a memory configured to:
   detect multiple physical downlink control channels (PDCCHs) in a slot of a control resource set (CORESET);
   identify one or more of the PDCCHs detected on resources of the CORESET that overlap with resources of at least one physical downlink shared channel (PDSCH) scheduled by at least one of the PDCCHs in the same slot;
   determine which of the identified PDCCHs to perform PDSCH rate matching around, wherein the determination is based on an ordering of each detected PDCCH within the CORESET; and
   process the PDSCH in accordance with the determination.

18. The apparatus of claim 17, wherein the ordering of each detected PDCCH is based on an index for a search space (SS) in which that PDCCH is detected.

19. The apparatus of claim 18, wherein:
   if the PDSCH is scheduled by a PDCCH detected in a SS having an index n, processing the PDSCH comprises rate matching the PDSCH in the CORESET around CCEs associated with SSs of a same aggregation level (AL), whose indexes are less than or equal to n.

20. The apparatus of claim 19, wherein the index for each SS is determined based on a function of at least one of: AL, a CCE position within the CORESET, a slot or time index, a UE index, a base station index, a carrier index, or a frequency index.

21. The apparatus of claim 19, wherein a range of values for an SS index for an SS set depends on an AL for that SS set.

22. The apparatus of claim 19, wherein the rate matching is based at least in part on guard period between the PDSCH and one of the identified PDCCHs.

23. The apparatus of claim 22, wherein the guard period is semi-statically configured.

24. The apparatus of claim 22, wherein the guard period is based at least in part on a capability of the UE reported to a network entity.

25. An apparatus for wireless communications by a network entity, comprising at least one processor and a memory configured to:
   transmit multiple physical downlink control channels (PDCCHs) to a user equipment (UE) in a slot of a control resource set (CORESET);
   identify one or more of the PDCCHs that overlap with resources of at least one physical downlink shared channel (PDSCH) scheduled by at least one of the PDCCHs in the same slot;
   determine which of the identified PDCCHs to perform PDSCH rate matching around, wherein the determination is based on an ordering of each detected PDCCH within the CORESET; and
   transmit the PDSCH in accordance with the determination.

26. The apparatus of claim 25, wherein the ordering of each detected PDCCH is based on an index for a search space (SS) in which that PDCCH is detected.

* * * * *